US012679288B2

(12) United States Patent
Porcs et al.

(10) Patent No.: US 12,679,288 B2
(45) Date of Patent: Jul. 14, 2026

(54) APPARATUS, SYSTEM, AND METHOD FOR VEHICLE CENTER CONSOLE WITH REMOVABLE RETAINING FEATURE FOR A MOBILE DEVICE

(71) Applicant: Toyota Motor Engineering & Manufacturing North America, Inc., Plano, TX (US)

(72) Inventors: Robert Porcs, Saline, MI (US); Francis Sagayaraj, Ann Arbor, MI (US); Jonathan J. Quijano, Ann Arbor, MI (US)

(73) Assignees: TOYOTA MOTOR ENGINEERING & MANUFACTURING NORTH AMERICA, INC., Plano, TX (US); TOYOTA JIDOSHA KABUSHIKI KAISHA (JP)

( * ) Notice: Subject to any disclaimer, the term of this patent is extended or adjusted under 35 U.S.C. 154(b) by 363 days.

(21) Appl. No.: 18/243,064

(22) Filed: Sep. 6, 2023

(65) Prior Publication Data

US 2025/0074329 A1     Mar. 6, 2025

(51) Int. Cl.
| | |
|---|---|
| B60R 11/02 | (2006.01) |
| B60R 11/00 | (2006.01) |
| H04M 1/04 | (2006.01) |

(52) U.S. Cl.
CPC ........... *B60R 11/0241* (2013.01); *H04M 1/04* (2013.01); *B60R 2011/0007* (2013.01); *B60R 2011/0075* (2013.01)

(58) Field of Classification Search
CPC .................................................. B60R 11/0241
See application file for complete search history.

(56) References Cited

U.S. PATENT DOCUMENTS

| | | | | | |
|---|---|---|---|---|---|
| 3,193,232 | A | * | 7/1965 | Hatcher ................. | B60R 11/02 |
| | | | | | 224/420 |
| 5,825,874 | A | * | 10/1998 | Humphreys ........... | H04M 1/04 |
| | | | | | 379/446 |

(Continued)

FOREIGN PATENT DOCUMENTS

| | | |
|---|---|---|
| CN | 207579510 U | 7/2018 |
| CN | 211606201 U | 9/2020 |

(Continued)

*Primary Examiner* — Jonathan Malikasim
(74) *Attorney, Agent, or Firm* — Snell & Wilmer LLP

(57) ABSTRACT

Apparatuses, systems, and methods include a vehicle center console including a first surface configured to receive a mobile device thereon and a second surface facing the first surface and having a removable mobile device retaining apparatus mounted to the second surface. The mobile device is configured to be received between the first surface and the mobile device retaining apparatus. The mobile device retaining apparatus includes a body having a wall and a flexible contacting surface extending from the wall toward the first surface, a first retaining feature extending from the wall through a first aperture in the second surface, and a second retaining feature extending from the wall through a second aperture in the second surface. The flexible contacting surface can press the mobile device against the first surface to passively secure the mobile device in place, while also allowing ease of installation and removal of the mobile device.

19 Claims, 5 Drawing Sheets

(56)                    References Cited

U.S. PATENT DOCUMENTS

|  |  |  |  |  |
|---|---|---|---|---|
| 7,194,087 | B2 * | 3/2007 | Luginbill | H04M 1/04 |
|  |  |  |  | 455/90.3 |
| 10,328,834 | B2 * | 6/2019 | Kelat | F16B 21/086 |
| 10,493,922 | B2 * | 12/2019 | Perez | B60N 3/103 |
| 10,773,657 | B2 * | 9/2020 | Palaka | H02J 7/0044 |
| 10,967,806 | B2 * | 4/2021 | Pliego | B60R 16/02 |
| 12,370,958 | B2 * | 7/2025 | Natori | B60R 11/0241 |
| 2021/0347313 | A1 * | 11/2021 | Marquez Costa | F16B 5/0657 |
| 2025/0026274 | A1 * | 1/2025 | Moore | B60R 7/08 |
| 2025/0026275 | A1 * | 1/2025 | Moore | B60R 7/04 |

FOREIGN PATENT DOCUMENTS

| KR | 101726176 | B1 | 4/2017 |
|---|---|---|---|
| KR | 101974055 | B1 | 4/2019 |
| KR | 102157957 | B1 | 9/2020 |
| WO | 2021201717 | A1 | 10/2021 |

* cited by examiner

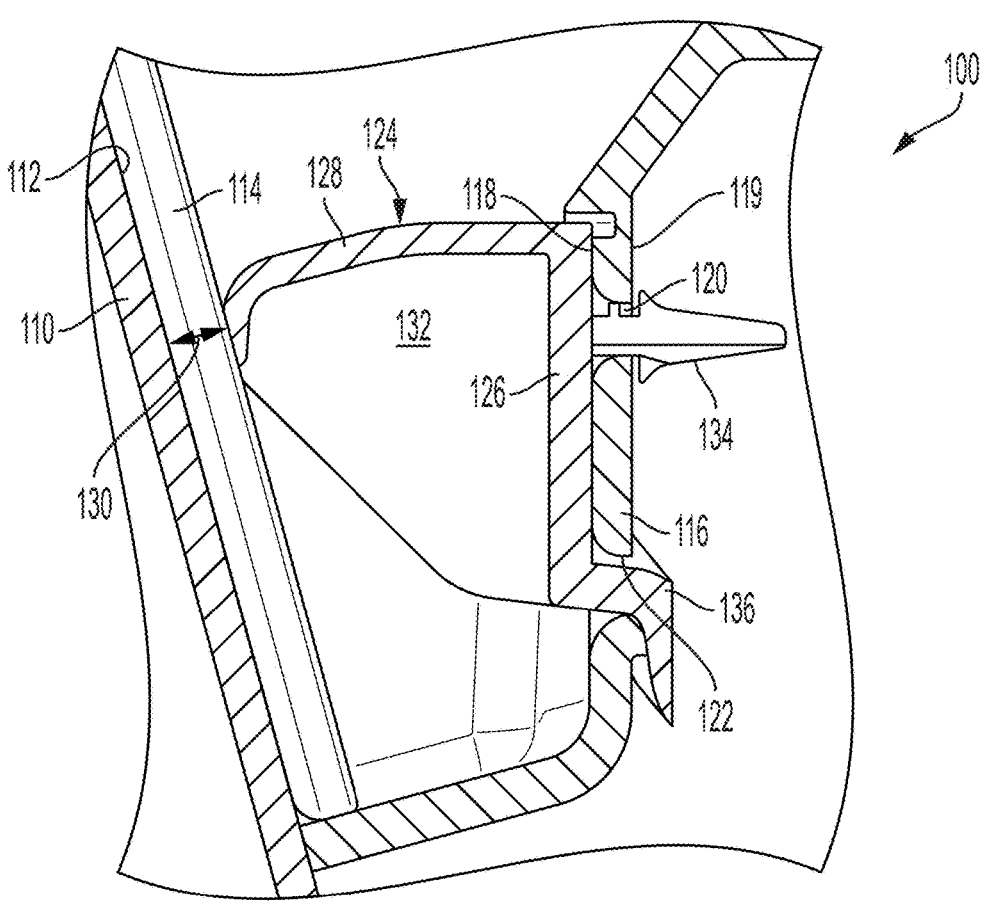
FIG. 1A
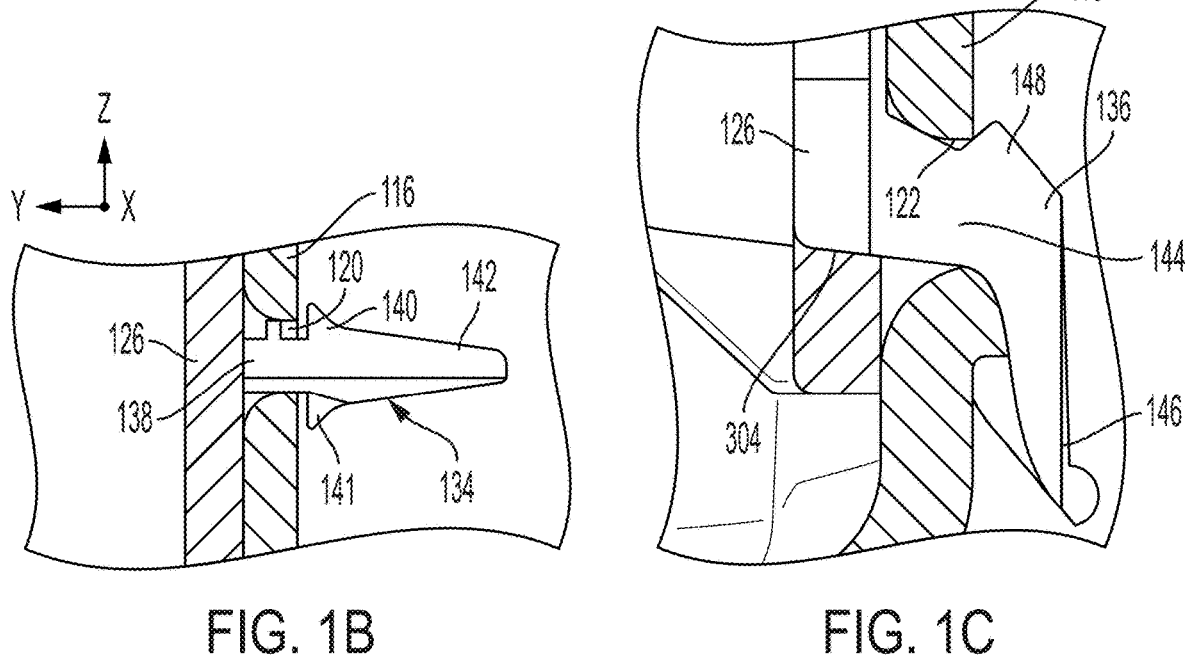
FIG. 1B                    FIG. 1C

600

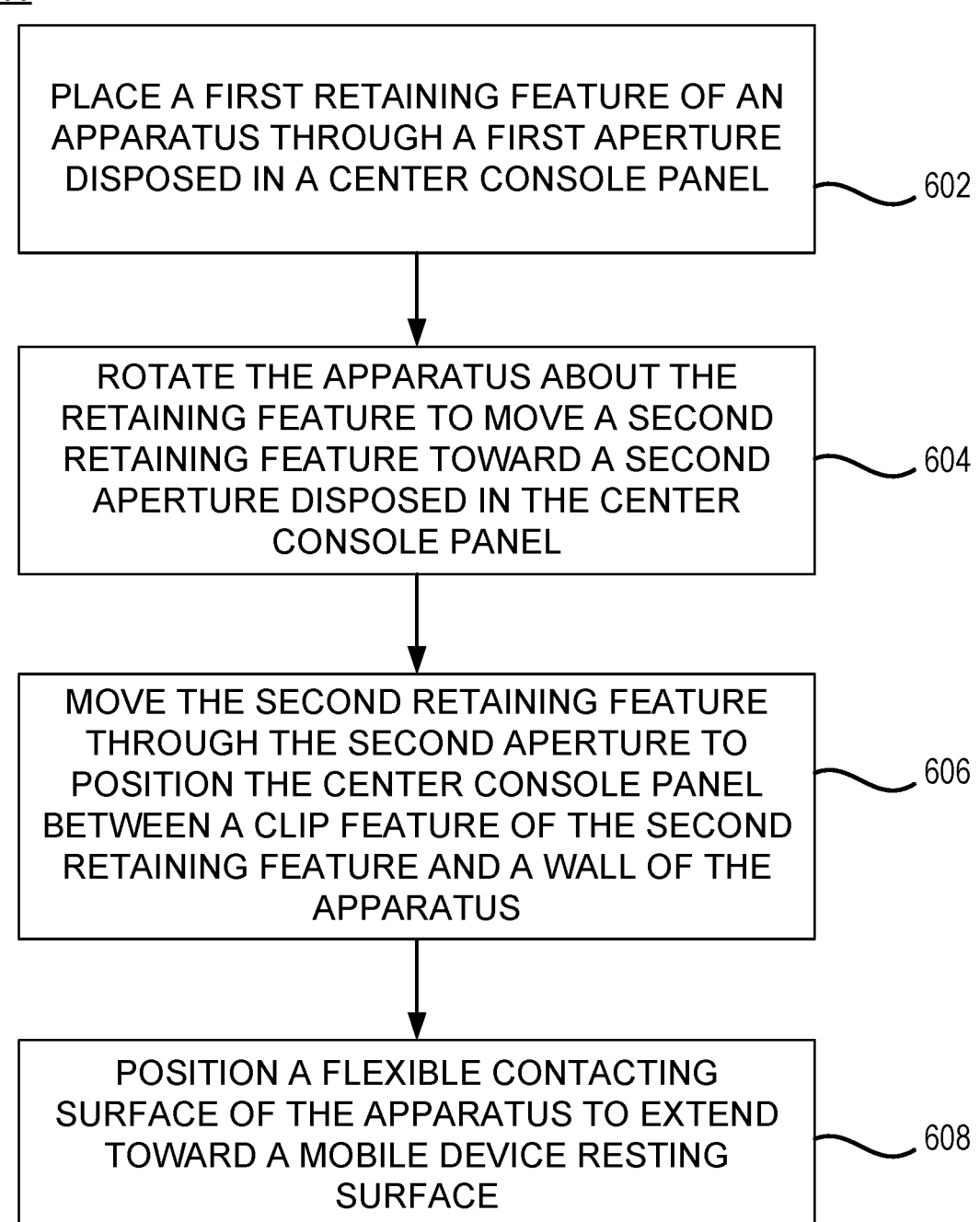

PLACE A FIRST RETAINING FEATURE OF AN APPARATUS THROUGH A FIRST APERTURE DISPOSED IN A CENTER CONSOLE PANEL ⟋ 602

ROTATE THE APPARATUS ABOUT THE RETAINING FEATURE TO MOVE A SECOND RETAINING FEATURE TOWARD A SECOND APERTURE DISPOSED IN THE CENTER CONSOLE PANEL ⟋ 604

MOVE THE SECOND RETAINING FEATURE THROUGH THE SECOND APERTURE TO POSITION THE CENTER CONSOLE PANEL BETWEEN A CLIP FEATURE OF THE SECOND RETAINING FEATURE AND A WALL OF THE APPARATUS ⟋ 606

POSITION A FLEXIBLE CONTACTING SURFACE OF THE APPARATUS TO EXTEND TOWARD A MOBILE DEVICE RESTING SURFACE ⟋ 608

FIG. 6

APPARATUS, SYSTEM, AND METHOD FOR VEHICLE CENTER CONSOLE WITH REMOVABLE RETAINING FEATURE FOR A MOBILE DEVICE

BACKGROUND

Field

The present disclosure relates to apparatuses, systems, and methods for holding or mounting articles within a vehicle and, more particularly, to apparatuses, systems, and methods for holding or mounting a mobile device to a vehicle console.

Description of the Related Art

In some vehicles, the center console includes a shift lever (e.g., a gear selector for a manual transmission vehicle or a gear selector for an automatic transmission vehicle) or a parking brake lever. Typically located forward of the shift lever or parking brake lever, the console may include a panel for a user to charge their phone, or simply to set their phone for viewing during driving, for example, to see directions. However, vehicle accelerations may cause the phone to tip over and/or break free from the panel surface, causing interruption in the charging process or placing the phone in an undesirable position. The phone may also contact the shift lever or parking brake lever.

Accordingly, there is a need for a system and a method for retaining the phone against the panel, particularly during vehicle accelerations.

SUMMARY

In general, one aspect of the subject matter described in this disclosure may be embodied in a removable mobile device retaining apparatus for a vehicle. The apparatus includes a body having a wall and a flexible contacting surface extending from the wall in a first direction, the wall extends laterally between and to a first end of the body and a second end of the body, and the wall extends perpendicular to a lateral direction between and to a first side of the body and a second side of the body. The apparatus further includes a first retaining feature extending from the wall in a second direction opposite the first direction. The apparatus further includes a second retaining feature extending from the wall in the second direction, the second retaining feature located at least partially between the first retaining feature and the second side of the body.

These and other embodiments may optionally include one or more of the following features. The second retaining feature can include a hook having a first portion that extends away from the wall in the second direction and a second portion that extends perpendicular to the first portion. The apparatus can further include a first clip feature extending from the first portion of the second retaining feature, the first clip feature is spaced apart from the wall and configured to secure a vehicle panel between the wall and the first clip feature. The first retaining feature can include a tab extending away from the wall in the second direction and a second clip feature extending from the tab of the first retaining feature, the second clip feature is spaced apart from the wall and configured to secure a vehicle panel between the wall and the second clip feature. The first retaining feature can further include a pull tab that extends away from the wall in the second direction. The first retaining feature can further include a third clip feature disposed opposite the tab from the second clip feature and the third clip feature is spaced apart from the wall and configured to secure the vehicle panel between the wall and the third clip feature. The first retaining feature can be laterally offset from the second retaining feature.

The body can be configured to be suspended from a vehicle panel using the first retaining feature and the second retaining feature. The flexible contacting surface can define a cavity disposed between the flexible contacting surface and the wall. The wall can define a planar surface.

In one aspect, the subject matter may be embodied in a vehicle center console. The vehicle center console can include a first surface configured to receive a mobile device thereon. The vehicle center console can further include a second surface facing the first surface and having a first aperture and a second aperture, and the mobile device is configured to be received between the first surface and the second surface. The vehicle center console can further include a mobile device retaining apparatus mounted to the second surface. The mobile device retaining apparatus includes a body having a wall and a flexible contacting surface extending from the wall toward the first surface in a first direction, the wall extends laterally between and to a first end of the body and a second end of the body, and the wall extends perpendicular to a lateral direction between and to a first side of the body and a second side of the body. The mobile device retaining apparatus further includes a first retaining feature extending from the wall through the first aperture in a second direction opposite the first direction, and a second retaining feature extending from the wall through the second aperture in the second direction, the second retaining feature located at least partially between the first retaining feature and the second side of the body.

These and other aspects and embodiments may optionally include one or more of the following features. The flexible contacting surface can be configured to press the mobile device against the first surface.

The second retaining feature can include a hook having a first portion that extends away from the wall in the second direction and a second portion that extends perpendicular to the first portion. The vehicle center console can further include a first clip feature extending from the first portion of the second retaining feature, the first clip feature is spaced apart from the wall and configured to secure a vehicle panel between the wall and the first clip feature.

The first retaining feature can include a tab extending away from the wall in the second direction and a second clip feature extending from the tab of the first retaining feature, the second clip feature is spaced apart from the wall and configured to secure a vehicle panel between the wall and the second clip feature. The first retaining feature can further include a pull tab that extends away from the wall in the second direction.

The flexible contacting surface can define a cavity disposed between the flexible contacting surface and the wall.

In one aspect, the subject matter may be embodied in a method. The method includes placing a first retaining feature of an apparatus through a first aperture disposed in a vehicle panel. The method further includes rotating the apparatus about the first retaining feature to move a second retaining feature toward a second aperture disposed in the vehicle panel. The method further includes moving the second retaining feature through the second aperture to position the vehicle panel between a clip feature of the second retaining feature and a wall of the apparatus. The method further includes positioning a flexible contacting surface of the apparatus to extend from the vehicle panel, and the flexible contacting surface and the first retaining feature are located on opposite sides of the vehicle panel.

These and other aspects and embodiments may optionally include one or more of the following features. The method further includes positioning the flexible contacting surface of the apparatus to extend toward a mobile device resting surface. The method further includes positioning the vehicle panel between a clip feature of the first retaining feature and the wall of the apparatus.

The foregoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

Other systems, methods, features, and advantages of the present invention will be or will become apparent to one of ordinary skill in the art upon examination of the following figures and detailed description. It is intended that all such additional systems, methods, features, and advantages be included within this description, be within the scope of the present invention, and be protected by the accompanying claims. Component parts shown in the drawings are not necessarily to scale and may be exaggerated to better illustrate the important features of the present invention. In the drawings, like reference numerals designate like parts throughout the different views, wherein:

FIG. 1A is a schematic fragmentary view of a vehicle center console with a removable mobile device retaining apparatus according to an embodiment of the present disclosure;

FIG. 1B is an enlarged view of a first retaining feature of the mobile device retaining apparatus of FIG. 1A according to an embodiment of the present disclosure;

FIG. 1C is an enlarged view of a second retaining feature of the mobile device retaining apparatus of FIG. 1A according to an embodiment of the present disclosure;

FIG. 6 is a flowchart illustrating a method installing a removable mobile device retaining apparatus to a vehicle center console panel according to an embodiment of the present disclosure.

DETAILED DESCRIPTION

Figure 2:
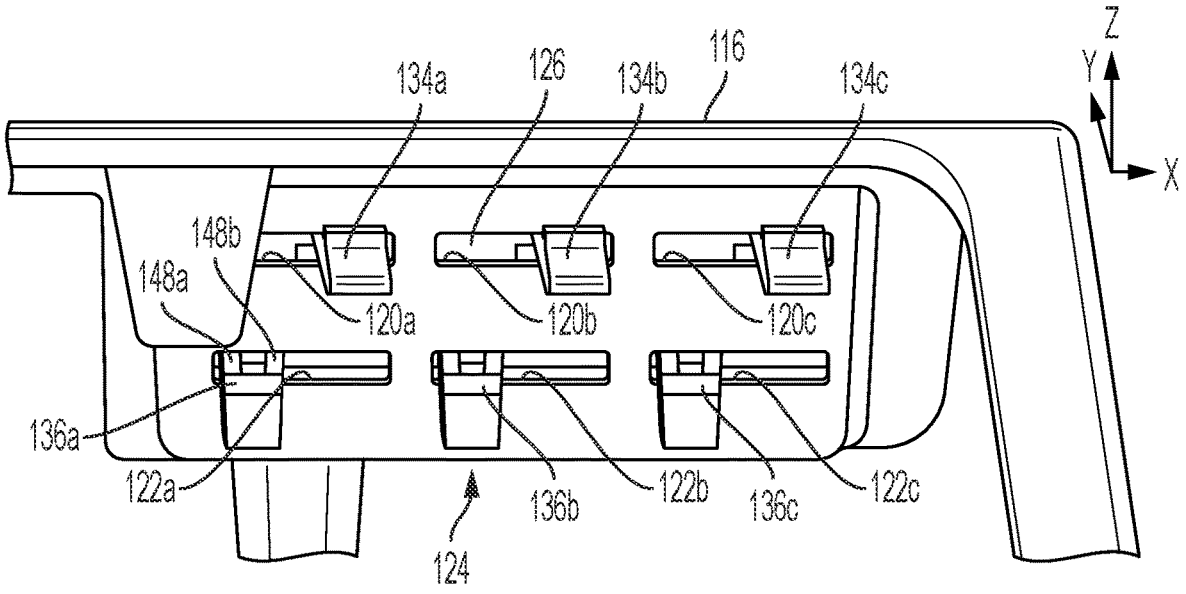
FIG. 2 as a perspective view of an interior surface of a vehicle center console with a removable mobile device retaining apparatus according to an embodiment of the present disclosure.

The present disclosure describes apparatuses, systems, and methods for mobile device securement to a vehicle. For instance, a mobile device retaining apparatus can utilize a flexible contacting surface (e.g., a rubber bulb or lip) as a separate component that is assembled with the vehicle structure (e.g., a vehicle center console). The flexible contacting surface is designed to apply contact forces to the mobile device to retain the mobile device when experiencing driving forces (e.g., acceleration/deceleration forces, turning forces, etc.). The flexible contacting surface is designed to achieve or provide these contact forces, while also allowing for ease of phone installation, securement and removal. The mobile device retaining apparatus further includes clip attachments to allow for ease of installation/removal, while also ensuring the apparatus does not detach from the vehicle panel during normal use.

Designing the apparatus as a separate piece from the rest of the vehicle components allows flexibility in material selection for both the vehicle structural parts (e.g., the console panel) and the apparatus and allows for serviceability of the apparatus separate from any other component. This also allows for future personalization in the design of the apparatus for fitting or matching individual customer mobile devices. The use of a separate part also allows for flexibility in shape options, functions, performance, and appearance in injection molding, extrusion, and attachment. The apparatus also allows for flexibility in the shape and mounting such that the part can be designed for good end appearance, or the part can alternatively be hidden from view.

Referring to the drawings, wherein like reference numbers correspond to like or similar components throughout the several figures, FIG. 1A generally shows an apparatus for a vehicle having a center console 100 that includes a panel 110 (also referred to herein as a first panel) having a first surface 112 (also referred to herein as a mobile device resting surface) configured to receive a mobile device 114 (e.g., mobile phone, tablet, etc.) thereon. The panel 110 can be part of a vehicle dash and/or a console. The first surface 112 can face a driver and/or a passenger of the vehicle. The first surface 112 can face a rearward direction with respect to the vehicle. The first surface 112 can be a charging surface for wirelessly recharging a battery of the mobile device. Accordingly, with the mobile device 114 placed against the first surface 112, a driver and/or a passenger of the vehicle can view a screen of the mobile device 114 while the vehicle is driving.

The center console 100 can further include a panel 116 (also referred to herein as a second panel) having a second surface 118 facing the first surface 112. The panel 116 can further include a back surface 119. The second surface 118 and the back surface 119 can face opposite directions. The panel 116 can be part of a vehicle console and/or a vehicle dash. The panel 110 and the panel 116 are configured to receive the mobile device 114 between the first surface 112 and the second surface 118.

The center console 100 can further include an apparatus 124 (also referred to herein as a mobile device retaining apparatus) mounted to the panel 116. The apparatus 124 can extend from the panel 116 toward the panel 110. The apparatus 124 can include a body having a wall 126 and a flexible contacting surface 128 extending from the wall 126. The flexible contacting surface 128 can extend from the wall 126 toward the first surface 112. The flexible contacting surface 128 can be formed as a bulb or a lip extending from the wall 126. The flexible contacting surface 128 can be made from a flexible material (e.g., rubber, etc.) and can be configured to push the mobile device 114 against the first surface 112 when the mobile device 114 is installed between the apparatus 124 and the panel 110. The apparatus 124 can be hollow and/or define a cavity 132 for facilitating flexibility of the apparatus 124 for accommodating mobile devices 114 of varying thicknesses while also applying adequate pressure against the mobile device 114 to secure the mobile device 114 against the first surface 112. The cavity 132 can be disposed between, and at least partially defined by, the flexible contacting surface 128 and the wall 126. A void or gap 130 can exist between the apparatus 124 and the panel 110 and the mobile device 114 can be placed in the gap 130 when placing the mobile device 114 against the first surface 112. The gap 130 can be less than a thickness of the mobile device 114 such that the gap 130 increases, and the flexible contacting surface 128 compresses, when the mobile device 114 is placed between the panel 110 and the apparatus 124.

The apparatus 124 can be mounted to the panel 116. The apparatus 124 can be suspended from the panel 116. The panel 116 can have a first aperture 120 and a second aperture 122 disposed thereon. The first aperture 120 and the second aperture 122 can extend through the second surface 118. The first aperture 120 and the second aperture 122 can extend through the back surface 119. The apparatus 124 can further include a retaining feature 134 (also referred to herein as a first retaining feature) extending from the wall 126. The apparatus 124 can further include a retaining feature 136 (also referred to herein as a second retaining feature) extending from the wall 126. The retaining feature 134 can extend through the first aperture 120 when the apparatus 124 is in the installed position. The retaining feature 136 can extend through the second aperture 122 when the apparatus 124 is in the installed position.

FIG. 1B shows the retaining feature 134 installed in the panel 116. The retaining feature 134 can include a tab 138 extending away from the wall 126. The retaining feature 134 can further include a clip feature 140 extending from the tab 138 and spaced apart from the wall 126 and configured to secure the panel 116 between the wall 126 and the clip feature 140. In the illustrated embodiment, the flexible contacting surface 128 extends in a first direction (e.g., the positive y-direction) from the wall 126, the tab 138 extends in a second direction (e.g., the negative y-direction) from the wall 126, and the clip feature 140 extends in a third direction (e.g., the positive z-direction) from the tab 138. The clip feature 140 can be a flange, a protrusion, a bump, or the like extending from the tab 138 to engage the panel 116. The clip feature 140 can help secure the tab 138 from being pulled out of the first aperture 120. The clip feature 140 can be configured to compress and/or deform to fit through the first aperture 120 and can return to its original, or near original, shape after being moved through the first aperture 120 to act as a stop to secure the retaining feature 134 with respect to the panel 116.

The retaining feature 134 can further include a clip feature 141 extending from the tab 138 and spaced apart from the wall 126 and configured to secure the panel 116 between the wall 126 and the clip feature 140. The clip feature 141 can be shaped as a mirror image of the clip feature 140.

The retaining feature 134 can further include a pull tab 142 that extends away from the wall 126. The pull tab 142 can be a continuation of the tab 138 that extends past the clip feature 140. Stated differently, the pull tab 142 can be coaxial with the tab 138. The pull tab 142 can provide a surface for pulling the retaining feature 134 through the first aperture 120 to aide in installing the apparatus 124.

FIG. 1C shows the retaining feature 136 installed in the panel 116. The retaining feature 136 can include a hook having a first portion 144 that extends away from the wall 126 in the second direction (e.g., the negative y-direction)

and a second portion 146 that extends perpendicular (e.g., in the negative z-direction) to the first portion 144. The retaining feature 136 can further include a clip feature 148 extending from the first portion 144 and spaced apart from the wall 126 and configured to secure the panel 116 between the wall 126 and the clip feature 148. The clip feature 148 can be a flange, a protrusion, a bump, or the like extending from the first portion 144 to engage the panel 116. The clip feature 148 can help secure the first portion 144 from being pulled out of the second aperture 122. The clip feature 148 can be configured to compress and/or deform to fit through the second aperture 122 and can return to its original, or near original, shape after being moved through the second aperture 122 to act as a stop to secure the retaining feature 136 with respect to the panel 116.

FIG. 2 shows an interior view of the panel 116 with the apparatus 124 installed thereto. In various embodiments, a plurality of retaining features 134 (e.g., a retaining feature 134a, a retaining feature 134b, and a retaining feature 134c; referred to generally as the retaining features 134) are disposed laterally along the wall 126 of the apparatus 124. Similarly, in various embodiments, a plurality of retaining features 136 (e.g., a retaining feature 136a, a retaining feature 136b, and a retaining feature 136c; referred to generally as the retaining features 136) are disposed laterally along the wall 126 of the apparatus 124. In various embodiments, the retaining features 134 are laterally offset (i.e., along the x-direction) from the retaining features 136, which can aide in the manufacture of the apparatus 124 and/or the accessibility of the retaining features 134, and 136.

In various embodiments, the clip feature 148 of each retaining feature 136 includes discrete clip features 148a and 148b laterally spaced apart and disposed at opposing ends of the retaining feature 136.

Figure 3:
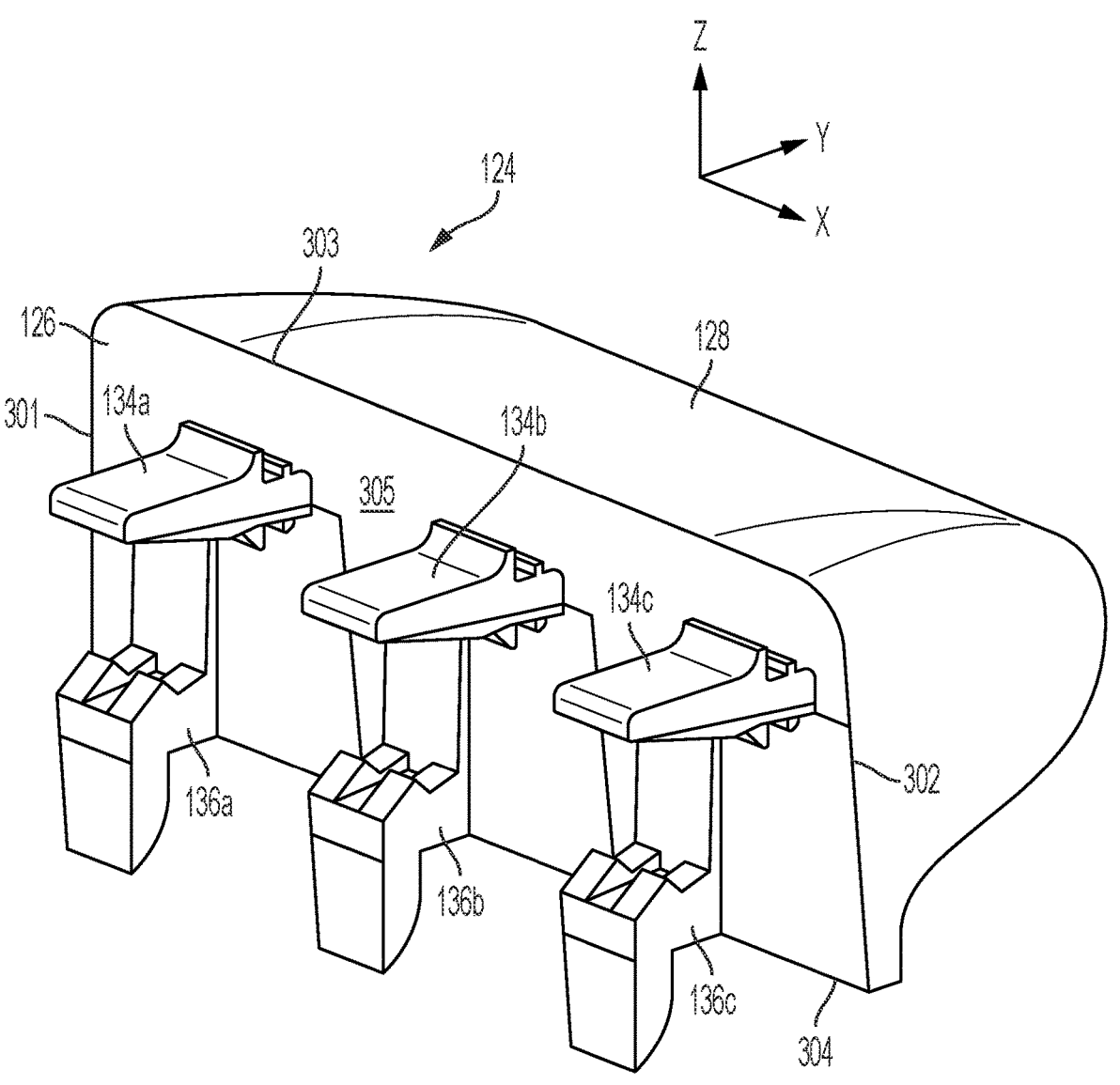
FIG. 3 as a perspective view of a removable mobile device retaining apparatus according to an embodiment of the present disclosure.

FIG. 3 shows a perspective view of the apparatus 124, in accordance with various embodiments. The wall 126 can extend laterally between and to a first end 301 of the apparatus body and a second end 302 of the apparatus body. The wall 126 can further extend perpendicular to the lateral direction (e.g., along the z-direction) between and to a first side 303 (e.g., a top side) of the apparatus body and a second side 304 (e.g., a bottom side) of the apparatus body. The retaining feature 136 is located at least partially between the retaining feature 134 and the second side 304 of the apparatus body. As best seen in FIG. 1C, the second portion 146 of the retaining feature 136 can extend beyond the second side 304. The wall 126 can define a planar surface 305. The planar surface 305 can extend laterally between and to the first end 301 and a second end 302. The planar surface 305 can extend between and to the first side 303 and the second side 304.

In various embodiments, the flexible contacting surface 128 extends from the first side 303 of the wall 126. The flexible contacting surface 128 can further extend from the first end 301 of the wall 126. The flexible contacting surface 128 can further extend from the second end 302 of the wall 126.

Figure 4:
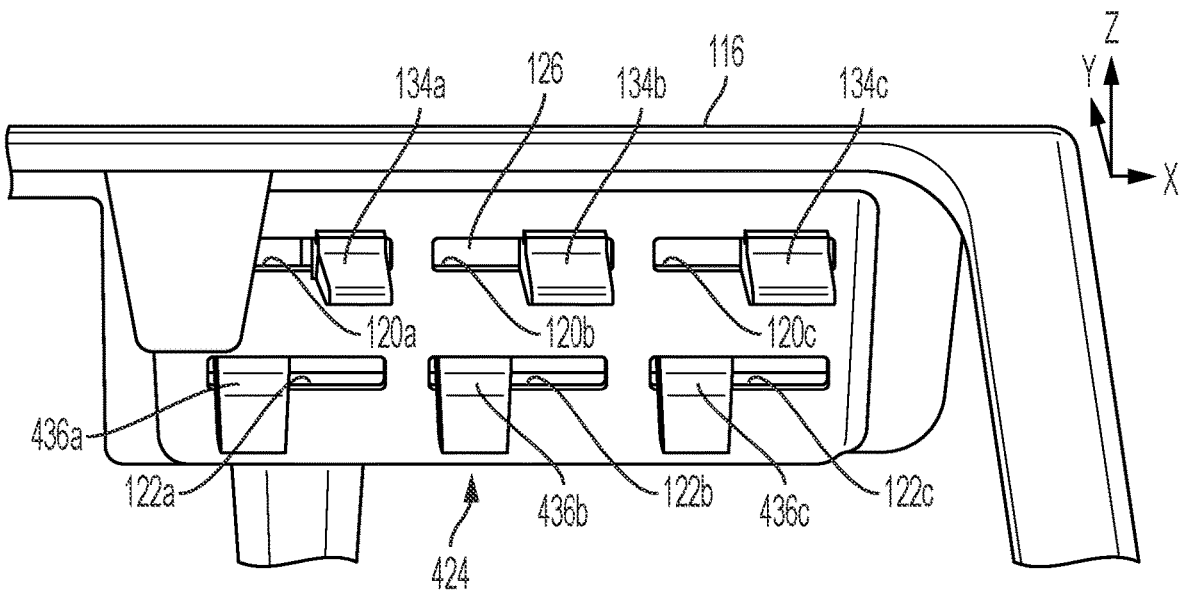
FIG. 4 as a perspective view of an interior surface of a vehicle center console with a removable mobile device retaining apparatus according to an embodiment of the present disclosure.

FIG. 4 shows an interior view of the panel 116 with an apparatus 424 installed thereto. Apparatus 424 is similar to apparatus 124 of FIG. 2, except the retaining features 436 of apparatus 424 are devoid of clip features.

Figure 5:
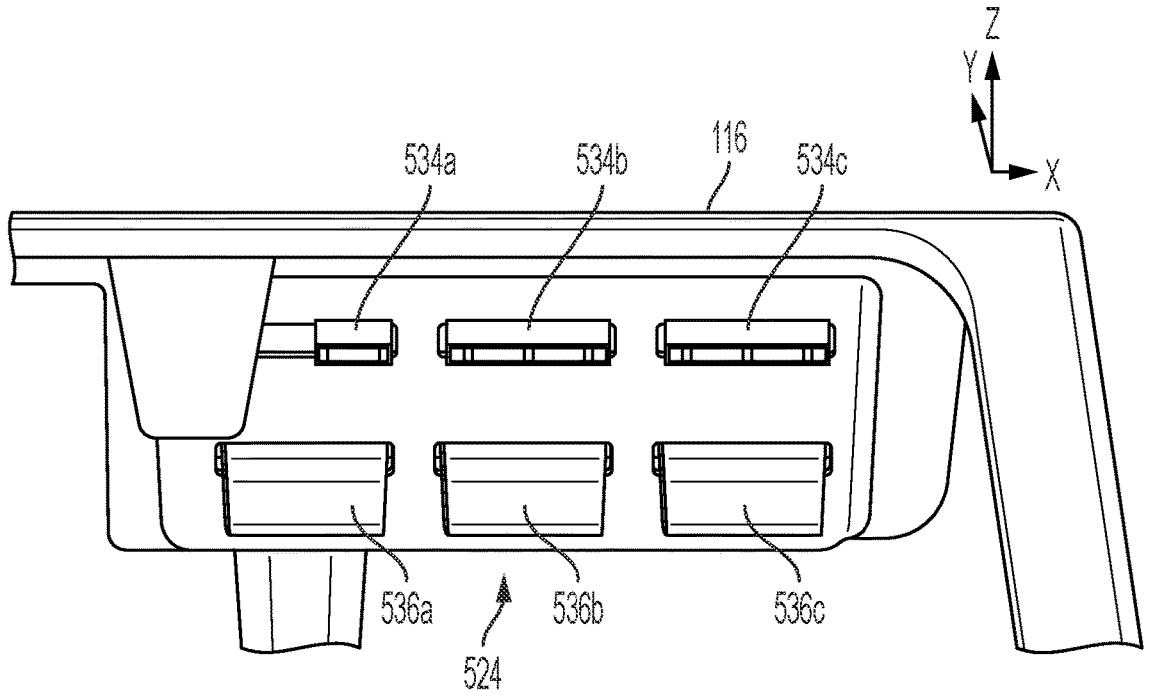
FIG. 5 as a perspective view of an interior surface of a vehicle center console with a removable mobile device retaining apparatus according to an embodiment of the present disclosure.

FIG. 5 shows an interior view of the panel 116 with an apparatus 524 installed thereto. Apparatus 524 is similar to apparatus 124 of FIG. 2, except the retaining features 534 of apparatus 524 are laterally aligned with the retaining features 536 of apparatus 524.

With reference to FIG. 6, a flowchart illustrating a method 600 is provided. In various embodiments, the method 600 is a method for installing a mobile device retaining apparatus to a vehicle center console panel. For ease of description, the method 600 is described below with reference to FIG. 1A through FIG. 1C. The method 600 of the present disclosure, however, is not limited to use of the exemplary center console 100 of FIG. 1A through FIG. 1C.

In step 602, the method 600 includes placing the retaining feature 136 of the apparatus 124 through the aperture 122 disposed in the panel 116. For example, the second portion 146 can be moved through the aperture 122.

In step 604, the method 600 includes rotating the apparatus 124 about the retaining feature 136 (e.g., clockwise as viewed in FIG. 1A) to move the retaining feature 134 toward the aperture 120 disposed in the panel 116. The second portion 146 can be moved through the aperture 122 and the first portion 144 moved into the aperture 122 as the apparatus 124 is rotated into the installed position.

In step 606, the method 600 includes moving the retaining feature 134 into (e.g., at least partially through) the aperture 120 to position the panel 116 between the clip feature 140 of the retaining feature 134 and the wall 126 of the apparatus 124.

In step 608, the method 600 includes positioning the flexible contacting surface 128 to extend toward surface 112. The flexible contacting surface 128 can be positioned to extend toward surface 112 as a result of steps 602-606. In this manner, the flexible contacting surface 128 can be positioned to extend toward the surface 112 to engage the mobile device 114 and to hold the mobile device 114 with respect to the surface 112. The apparatus 124 can be uninstalled in the reverse order. Accordingly, the apparatus 124 is removably coupled to the panel 116.

Where used throughout the specification and the claims, "at least one of A or B" includes "A" only, "B" only, or "A and B." Exemplary embodiments of the apparatuses, the systems, and the methods described herein have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments (e.g., including a singular element where multiple elements are described and/or multiple elements where a singular element is described, etc.) that reasonably fall within the scope of the advancement to the art hereby contributed, and that that scope shall not be restricted, except in light of the appended claims and their equivalents.

What is claimed is:

1. An apparatus for a vehicle, the apparatus comprising:
   a body having a wall and a flexible contacting surface extending from the wall in a first direction, the wall extends laterally between and to a first end of the body and a second end of the body, and the wall extends perpendicular to a lateral direction between and to a first side of the body and a second side of the body;
   a first retaining feature extending from the wall in a second direction opposite the first direction, the first retaining feature points in the second direction; and
   a second retaining feature extending from the wall in the second direction, the second retaining feature located at least partially between the first retaining feature and the second side of the body, the second retaining feature includes a hook having a first portion that extends away from the wall in the second direction and a second portion that extends substantially perpendicular to the first portion such that the second retaining feature points substantially perpendicular to the second direction.

2. The apparatus of claim 1, further comprising a first clip feature extending from the first portion of the second retaining feature, the first clip feature is spaced apart from the wall and configured to secure a vehicle panel between the wall and the first clip feature.

3. The apparatus of claim 1, wherein the first retaining feature includes a tab extending away from the wall in the second direction and a second clip feature extending from the tab of the first retaining feature, the second clip feature is spaced apart from the wall and configured to secure a vehicle panel between the wall and the second clip feature.

4. The apparatus of claim 3, wherein the first retaining feature further includes a pull tab that extends away from the wall in the second direction.

5. The apparatus of claim 4, wherein the first retaining feature further includes a third clip feature disposed opposite the tab from the second clip feature and the third clip feature is spaced apart from the wall and configured to secure the vehicle panel between the wall and the third clip feature.

6. The apparatus of claim 1, wherein the first retaining feature is laterally offset from the second retaining feature.

7. The apparatus of claim 1, wherein the body is configured to be suspended from a vehicle panel using the first retaining feature and the second retaining feature.

8. The apparatus of claim 1, wherein the flexible contacting surface defines a cavity disposed between the flexible contacting surface and the wall.

9. The apparatus of claim 1, wherein the wall defines a planar surface.

10. The apparatus of claim 1, wherein:
   the first retaining feature and the second retaining feature are configured to suspend the body from a vehicle panel such that installation of the retaining features positions the flexible contacting surface to extend toward and bias a mobile device against a mobile-device resting surface; and
   with the second retaining feature disposed at least partially in a first aperture of the vehicle panel, the body and the first retaining feature are configured to rotate together about the second retaining feature and a lateral axis of the body to install the first retaining feature into a second aperture of the vehicle panel.

11. A vehicle center console, comprising:
   a first surface configured to receive a mobile device thereon;
   a second surface facing the first surface and having a first aperture and a second aperture, and the mobile device is configured to be received between the first surface and the second surface;
   a mobile device retaining apparatus mounted to the second surface, the mobile device retaining apparatus including:
      a body having a wall and a flexible contacting surface extending from the wall toward the first surface in a first direction, the wall extends laterally between and to a first end of the body and a second end of the body, and the wall extends perpendicular to a lateral direction between and to a first side of the body and a second side of the body;
      a first retaining feature extending from the wall through the first aperture in a second direction opposite the first direction, the first retaining feature points in the second direction; and a second retaining feature extending from the wall through the second aperture in the second direction, the second retaining feature located at least partially between the first retaining feature and the second side of the body, the second retaining feature includes a hook having a first portion that extends away from the wall in the second direction and a second portion that extends substantially perpendicular to the first portion such that the second retaining feature points substantially perpendicular to the second direction.

12. The vehicle center console of claim 11, wherein the flexible contacting surface is configured to press the mobile device against the first surface.

13. The vehicle center console of claim 11, further comprising a first clip feature extending from the first portion of the second retaining feature, the first clip feature is spaced apart from the wall and configured to secure a vehicle panel between the wall and the first clip feature.

14. The vehicle center console of claim 11, wherein the first retaining feature includes a tab extending away from the wall in the second direction and a second clip feature extending from the tab of the first retaining feature, the second clip feature is spaced apart from the wall and configured to secure a vehicle panel between the wall and the second clip feature.

15. The vehicle center console of claim 14, wherein the first retaining feature further includes a pull tab that extends away from the wall in the second direction.

16. The vehicle center console of claim 11, wherein the flexible contacting surface defines a cavity disposed between the flexible contacting surface and the wall.

17. A method comprising:

placing a first retaining feature of an apparatus through a first aperture disposed in a vehicle panel, the first retaining feature extending in a first direction through the vehicle panel;

with the first retaining feature of the apparatus disposed at least partially in the first aperture, rotating the apparatus about the first retaining feature and an axis oriented perpendicular to the first direction, to move a second retaining feature toward a second aperture disposed in the vehicle panel;

moving the second retaining feature through the second aperture, the second retaining feature including a hook having a portion that extends substantially perpendicular to the first direction, to position the vehicle panel between a clip feature of the second retaining feature and a wall of the apparatus; and positioning a flexible contacting surface of the apparatus to extend from the vehicle panel, and the flexible contacting surface and the first retaining feature are located on opposite sides of the vehicle panel.

18. The method of claim 17, further comprising positioning the flexible contacting surface of the apparatus to extend toward a mobile device resting surface.

19. The method of claim 18, further comprising positioning the vehicle panel between a clip feature of the first retaining feature and the wall of the apparatus.

* * * * *